(12) United States Patent
Yamamoto (10) Patent No.: US 11,933,025 B2
(45) Date of Patent: Mar. 19, 2024

(54) AIR FILTER DETERIORATION DETERMINATION DEVICE OF CONSTRUCTION MACHINE

(71) Applicant: Hitachi Construction Machinery Co., Ltd., Tokyo (JP)

(72) Inventor: Junji Yamamoto, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 616 days.

(21) Appl. No.: 17/274,069

(22) PCT Filed: Feb. 10, 2020

(86) PCT No.: PCT/JP2020/005165
§ 371 (c)(1),
(2) Date: Mar. 5, 2021

(87) PCT Pub. No.: WO2020/166568
PCT Pub. Date: Aug. 20, 2020

(65) Prior Publication Data
US 2022/0112692 A1    Apr. 14, 2022

(30) Foreign Application Priority Data
Feb. 12, 2019    (JP) ................... 2019-022972

(51) Int. Cl.
*G08B 21/00*    (2006.01)
*E02F 9/26*    (2006.01)
(Continued)

(52) U.S. Cl.
CPC .............. *E02F 9/26* (2013.01); *F02M 35/08* (2013.01); *F02M 35/1038* (2013.01); *G01N 15/0806* (2013.01); *G01N 2015/084* (2013.01)

(58) Field of Classification Search
CPC .. E02F 9/26; E02F 9/2066; E02F 9/24; F02M 35/08; F02M 35/1038; F02M 35/09;
(Continued)

(56) References Cited

U.S. PATENT DOCUMENTS 8,534,123 B2    9/2013  Herman et al.
8,701,473 B2 *  4/2014  Uehara ............... B01D 46/0086
                                                    73/114.37
(Continued)

FOREIGN PATENT DOCUMENTS

| JP | 2012-196146 A | 10/2012 |
| JP | 2013-36382 A | 2/2013 |
| JP | 2017-110495 A | 6/2017 |

OTHER PUBLICATIONS

International Search Report (PCT/ISA/210) issued in PCT Application No. PCT/JP2020/005165 dated Apr. 7, 2020 with English translation (five (5) pages).
(Continued)

*Primary Examiner* — Toan N Pham
(74) *Attorney, Agent, or Firm* — Crowell & Moring LLP (57) ABSTRACT

Each time clogging of a filter (5) of an air cleaner is determined on the basis of intake negative pressure of an engine (2), and the air filter (5) is cleaned, an accumulated value of operating time of the engine (2) from previous cleaning until clogging is determined is taken as a cleaning interval (S), and sequentially measured. A plurality of stages are previously set by classifying a minimum value and a maximum value of the cleaning interval (S), and the measured cleaning interval (S) is added to the stage to which the measured cleaning interval (S) is to belong, among the stages. A histogram in which an axis of abscissas is taken as the stage, an axis of ordinates is taken as frequency of the cleaning interval (S) is constructed, and an approximate straight line (L2) illustrated by a solid line is obtained by
(Continued)

approximating a characteristic line (L1) of the histogram illustrated by a dotted line to a straight line. A characteristic of the histogram is changed as the deterioration of the air filter (5) progresses, and when a slope of the approximate straight line (L2) based on the characteristic gradually decreases from right-upward slop illustrated by a thin line, exceeds ($\Delta Y/\Delta X=0$) equivalent to the horizontal, deterioration of the air filter is determined.

7 Claims, 8 Drawing Sheets

(51) Int. Cl.
  *F02M 35/08* (2006.01)
  *F02M 35/10* (2006.01)
  *G01N 15/08* (2006.01)

(58) Field of Classification Search
  CPC ............. F02M 35/164; G01N 15/0806; G01N 2015/084; B01D 46/0086; F02D 2041/227; F02D 2200/0406; F02D 41/22; F02D 41/0002; F02D 41/18; F02D 41/221; G07C 5/0808
  See application file for complete search history.

(56) References Cited

U.S. PATENT DOCUMENTS

| | | | |
|---|---|---|---|
| 9,739,244 B2* | 8/2017 | Dudar | .................. F02D 41/003 |
| 10,546,435 B2* | 1/2020 | Carpenter | .......... B01D 46/0002 |
| 2007/0146148 A1 | 6/2007 | Kawasaki et al. | |
| 2013/0036804 A1 | 2/2013 | Uehara | |
| 2017/0211498 A1 | 7/2017 | Moore et al. | |

OTHER PUBLICATIONS

Japanese-language Written Opinion (PCT/ISA/237) issued in PCT Application No. PCT/JP2020/005165 dated Apr. 7, 2020 (three (3) pages).
Extended European Search Report issued in European Application No. 20755228.2 dated Oct. 26, 2022 (eight (8) pages).
"Alban Cat Channel: Alban CAT Engine Air Filter Replacement", Youtube, Feb. 9, 2013, XP55970175, Retrieved from https://www.youtube.com/watch?v=pmGacXwdsSc (two (2) pages).
"Cat Products: Cat Wheel Loader Air 1-7 Filter Indicator—Maintenance Tips", Youtube, Sep. 27, 2011, XP055970178, Retrieved from https://www.youtube.com/watch?v=#owlTDJLY21Y (two (2) pages).

* cited by examiner

AIR FILTER DETERIORATION DETERMINATION DEVICE OF CONSTRUCTION MACHINE

TECHNICAL FIELD

The present invention relates to an air filter deterioration determination device of a construction machine.

BACKGROUND ART

An air cleaner is provided in an intake passage of an engine mounted as a power source on a construction machine in order to filter dust contained in intake air, and an air filter in the air cleaner gradually accumulates dust and becomes clogged. The clogging of the air filter increases the intake negative pressure, and causes decrease in engine output, deterioration of fuel efficiency, and the like, and therefore, for example, as described in Patent Document 1, a device that detects deterioration, that is, clogging of the air filter is proposed.

A clogging detection device in Patent Document 1 is intended for a filter of a passenger car engine, and when the intake negative pressure exceeds a set value, it is determined that the air filter is clogged and a warning light is turned on.

PRIOR ART DOCUMENT

Patent Document

Patent Document 1: Japanese Patent Laid-Open No. 2017-110495

SUMMARY OF THE INVENTION

Problems to be Solved by the Invention

However, the air filter clogging detection device described in Patent Document 1 only functions to detect clogging, and cannot determine the degree of deterioration of an air filter.

That is, in a case where the air filter is clogged, although the air filter is recovered by cleaning, not all the dust newly accumulated after previous cleaning is removed from the air filter, and some dust remains. Therefore, every time the air filter is repeatedly cleaned, the dust remaining on the air filter gradually accumulates immediately after cleaning, and at the limit of use of the air filter, a large amount of dust remains on the air filter even after cleaning, and a filtration function is not performed. This phenomenon is the deterioration of the air filter.

Particularly, since a construction machine such as a hydraulic excavator is used at a construction site where a large amount of dust such as powder dust and dirt is scattered, an air filter is clogged faster than an air filter used in a general passenger car or the like, and frequent air filter cleaning inevitably tends to cause rapid deterioration. Even when the air filter reaches replacement time, replacement may not be able to be performed immediately due to a restriction such as a construction schedule, and therefore it is very important to always grasp the degree of deterioration in order to predict the air filter replacement time in advance. Such a need cannot be met by the technique in Patent Document 1 that only detects the clogging of an air filter.

An object of the present invention, which has been made in order to solve such a problem, is to provide an air filter deterioration determination device of a construction machine capable of accurately determining a degree of deterioration of an air filter.

Means for Solving the Problems

In order to achieve the above object, an air filter deterioration determination device of a construction machine of the present invention is an air filter deterioration determination device of a construction machine including: an intake air pressure measurement device that measures intake negative pressure of a motor mounted as a power source of a construction machine; and a controller that is communicably connected to the motor and the intake air pressure measurement device, and determines deterioration of an air filter for removing dust in intake air to be supplied to the motor, wherein the controller includes: an intake air measurement value calculation unit that determines a degree of clogging of the air filter for filtering the intake air of the motor on the basis of the intake negative pressure measured by the intake air pressure measurement device; a storage unit that stores a plurality of groups previously set by classifying a minimum value to a maximum value of a cleaning interval, the cleaning interval being an accumulated value of operating time of the motor from previous cleaning of the air filter until the clogging is determined by the intake air measurement value calculation unit; a cleaning interval frequency calculation unit that measures the cleaning interval each time the clogging is determined by the intake air measurement value calculation unit and the air filter is cleaned, that sequentially adds the measured cleaning interval to a group to which the measured cleaning interval is to belong, among the plurality of groups, and that totalizes frequency of the cleaning interval in each of the groups; and a deterioration determination processing unit that determines a degree of deterioration of the air filter on the basis of the frequency of the cleaning interval in each of the group, the frequency being totalized by the cleaning interval frequency calculation unit.

Advantageous Effects of the Invention

According to an air filter deterioration determination device of a construction machine described in the present invention, it is possible to accurately determine a degree of deterioration of an air filter.

MODE FOR CARRYING OUT THE INVENTION

Hereinafter, one embodiment of a construction machine obtained by embodying the present invention will be described.

Figure 1:
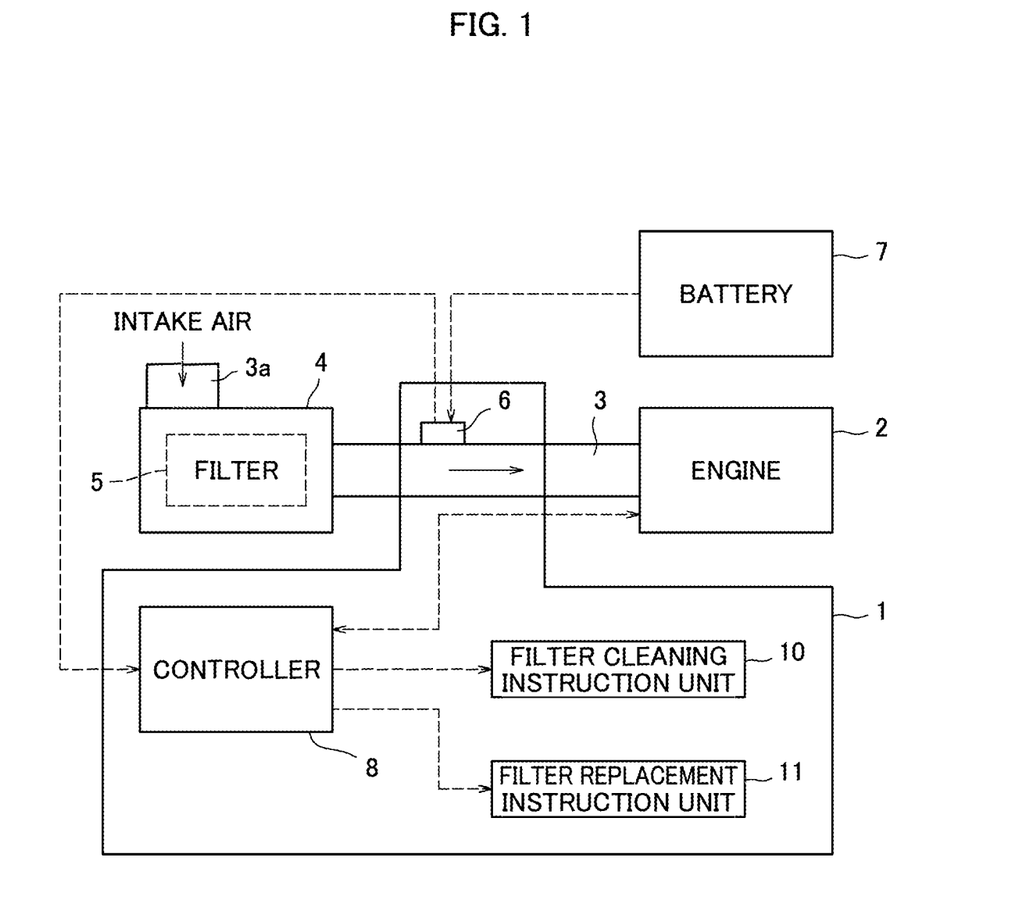
FIG. 1 is a whole configuration diagram illustrating an air filter deterioration determination device of a construction machine of an embodiment.

FIG. 1 is a whole configuration diagram illustrating an air filter deterioration determination device of a construction machine of this embodiment.

The air filter deterioration determination device 1 of this embodiment is intended for a diesel engine 2 (equivalent to a motor of the present invention) mounted as a power source in a construction machine such as a hydraulic excavator. An air cleaner 4 is provided in a suction port 3a of an intake passage 3 of an engine 2, and an air filter 5 is incorporated in the air cleaner 4. An intake air pressure measurement device 6 that measures intake negative pressure is attached to the intake passage 3, and power is supplied to the intake air pressure measurement device 6 by a vehicle-mounted battery 7.

A controller 8 (electronic control unit) is communicably connected to the engine 2. Although not illustrated, various sensors that measure an engine rotation speed, a cooling water temperature, and the like are connected to the input side of the controller 8, and various devices such as a fuel injection valve and an EGR valve are connected to the output side of the controller 8. The controller 8 controls a fuel injection amount, a fuel injection timing, an EGR opening degree, and the like of the engine 2 on the basis of information from the sensors, so that the engine 2 is operated.

As described below, the controller 8 performs a process of determining the degree of clogging and the degree of deterioration of the air filter 5. In order to perform the process, an air filter cleaning instruction unit 10 and an air filter replacement instruction unit 11 are connected to the controller 8. In this embodiment, a warning light that lights and displays an air filter cleaning sign is used as the air filter cleaning instruction unit 10, and a warning light that lights and displays an air filter replacement sign is used as the replacement instruction unit 11.

Figure 2:
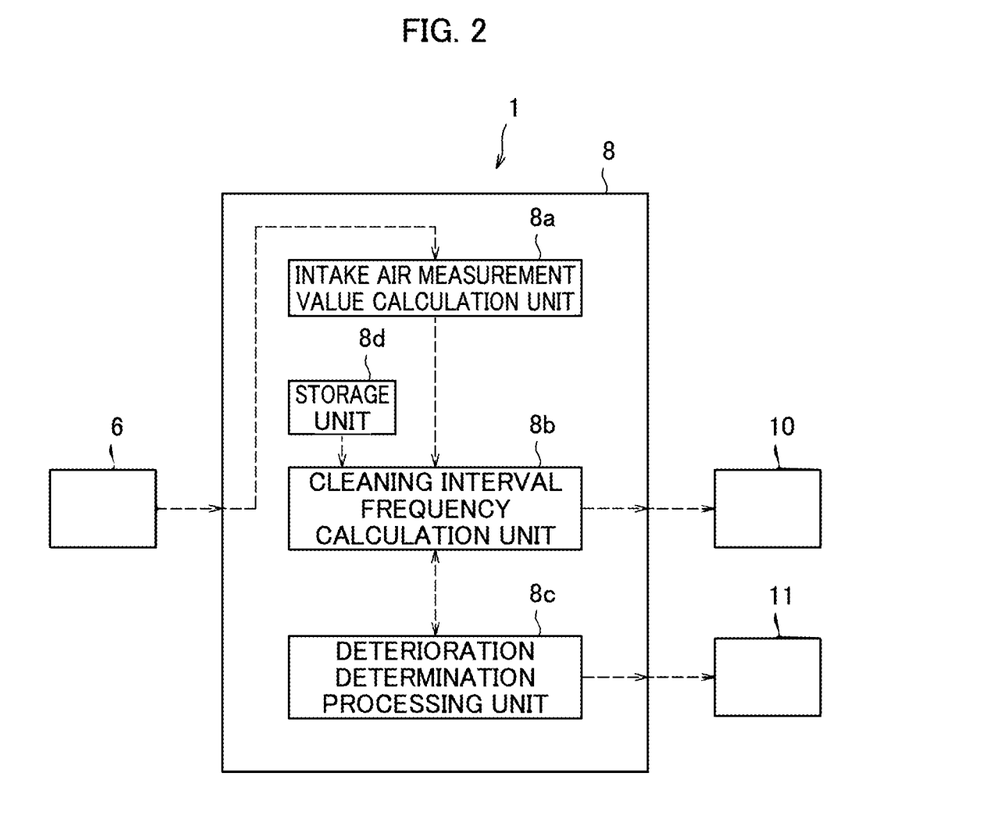
FIG. 2 is a control block diagram illustrating an internal configuration of a controller.

FIG. 2 is a control block diagram illustrating an internal configuration of the controller 8, and the controller 8 includes an intake air measurement value calculation unit 8a, a cleaning interval frequency calculation unit 8b, a deterioration determination processing unit 8c, and a storage unit 8d.

When the intake air measurement value calculation unit 8a determines the degree of clogging of the air filter 5 on the basis of the intake negative pressure measured by the intake air pressure measurement device 6, and determines that the air filter 5 is clogged (hereinafter, expressed as "clogging is determined"), the air filter cleaning instruction unit 10 is operated.

The storage unit 8d stores a plurality of groups G0 to G7 (hereinafter referred to as stages) previously set by classifying a minimum value to a maximum value of a cleaning interval, the cleaning interval being an accumulated value of the operating time of the engine 2 from previous cleaning of the air filter 5 until the clogging is determined by the intake air measurement value calculation unit 8a.

The cleaning interval frequency calculation unit 8b sequentially measures a cleaning interval S for the air filter 5, constructs a histogram as the frequency of the cleaning interval S for each stage stored in the storage unit 8d, and stores the histogram in the storage unit 8d.

The deterioration determination processing unit 8c obtains an approximate straight line L2 (illustrated in FIG. 7) that correlates with the degree of deterioration of the air filter 5 from the histogram in the storage unit 8d, and determines the degree of deterioration of the air filter 5 on the basis of the slope of the approximate straight line L2. When it is determined that the air filter 5 is deteriorated (hereinafter, expressed as "deterioration is determined"), the air filter replacement instruction unit 11 is operated.

Hereinafter, the deterioration determination process of the air filter 5 by the controller 8 will be described, but prior to the description, a cleaning implementation status and a deterioration progress status of the air filter 5 will be described.

Figure 3:
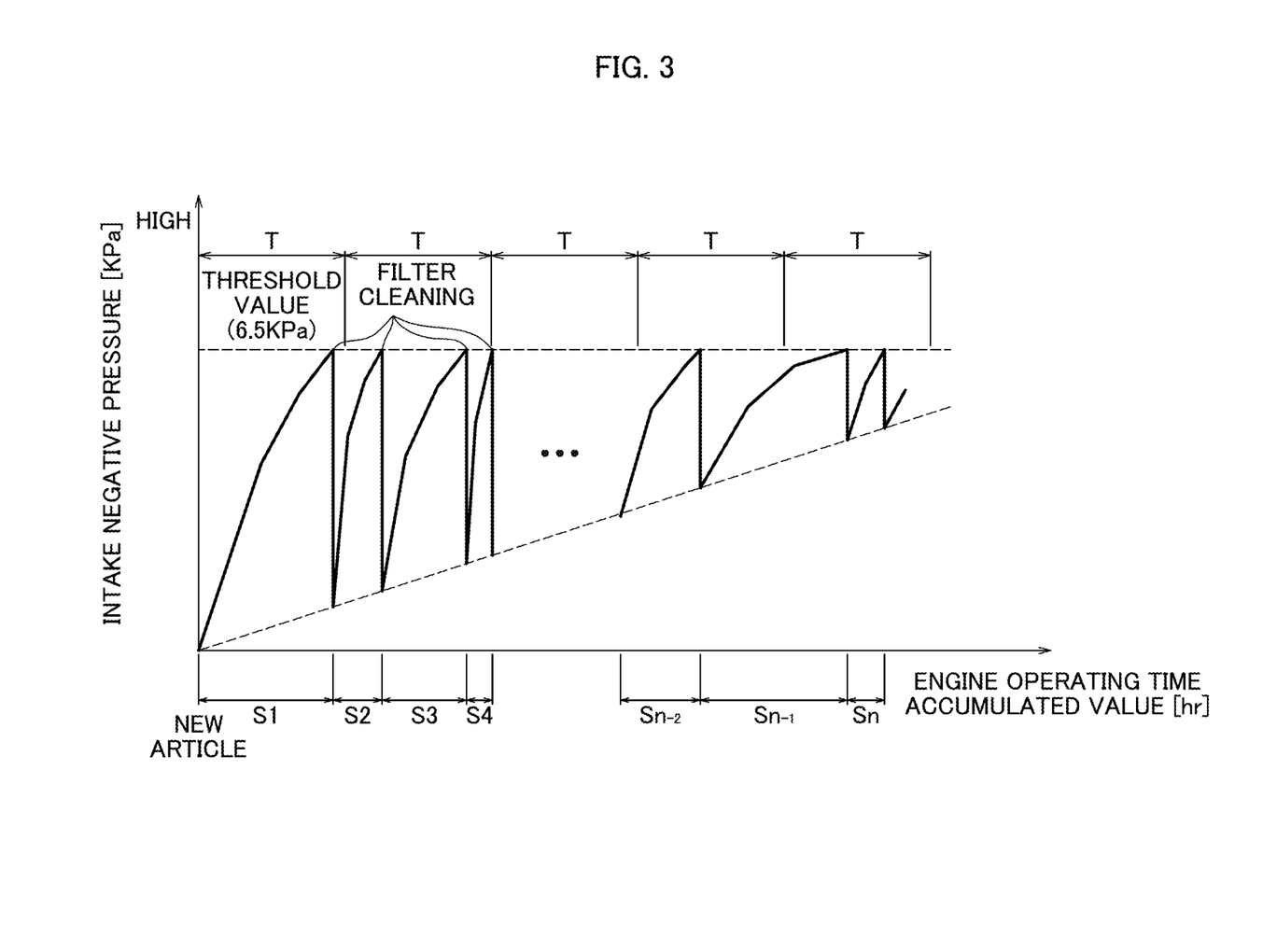
FIG. 3 is a time chart illustrating an air filter cleaning implementation status and an air filter deterioration progress status with the lapse of time.

FIG. 3 is a time chart illustrating the air filter cleaning implementation status and the air filter deterioration progress with the lapse of time. The axis of abscissas in the figure represents an accumulated value of the operating time of the engine 2 after replacement with a new air filter 5, and the axis of ordinates represents the intake negative pressure of the engine 2 (the air filter 5 is more prominently clogged toward the upper side).

When the operation of the engine 2 is started in a state in which the air filter 5 is new, intake air is filtered by the air filter 5 of the air cleaner 4, and the measurement of the cleaning interval S is started. Filtered dust gradually accumulates on the air filter 5, and intake negative pressure increases with the accumulation of the dust. In this embodiment, 6.5 KPa is set as a threshold value for determining the degree of clogging, and when the intake negative pressure reaches 6.5 KPa as described later, air filter cleaning is prompted by lighting of the air filter cleaning instruction unit 10. Consequently, an operator of the construction machine recognizes the clogging of the air filter 5, and performs cleaning, and at this time point, the measurement of the cleaning interval S is terminated. The measured cleaning interval S is the accumulated value of the operating time of the engine 2 from previous cleaning until the clogging is determined.

Even when the air filter 5 is cleaned, not all the dust newly accumulated from the previous cleaning is removed from the air filter 5, but some dust remains. Therefore, the intake negative pressure does not recover up to a value immediately after the above cleaning. As a result, the dust remaining on the air filter 5 gradually accumulates each time the cleaning is repeated, and the intake negative pressure immediately after the cleaning also gradually increases with increase of the accumulated dust. The deterioration of the air filter 5 progresses, and at a certain time point, the air filter 5 reaches the use limit, and even when the air filter 5 is cleaned, a large amount of dust remains on the filter 5 and a filtration function is not achieved.

The cleaning interval S (S1 to Sn) is measured each time the filter is cleaned, and the dust remaining on the air filter 5 is gradually accumulated as described above. Therefore, a shorter value is gradually measured as the cleaning interval S, basically. On the other hand, the cleaning interval S is also affected by environment in which the construction machine operates. Specifically, the more dust the outside air contains in the environment, the shorter cleaning interval S is measured even when the degree of deterioration of the air filter 5 is the same. This is because the intake negative pressure reaches a threshold value earlier because a dust accumulation rate on the air filter 5 is high. Therefore, as illustrated in FIG. 3, when the environment in which the construction machine is operated changes, the cleaning interval S sometimes increases as well as decrease with respect to a previously measured value.

On the assumption of the cleaning implementation status and the deterioration progress status of the air filter 5 as described above, the controller 8 performs the deterioration determination process of the air filter 5 as described below.

Figure 4:
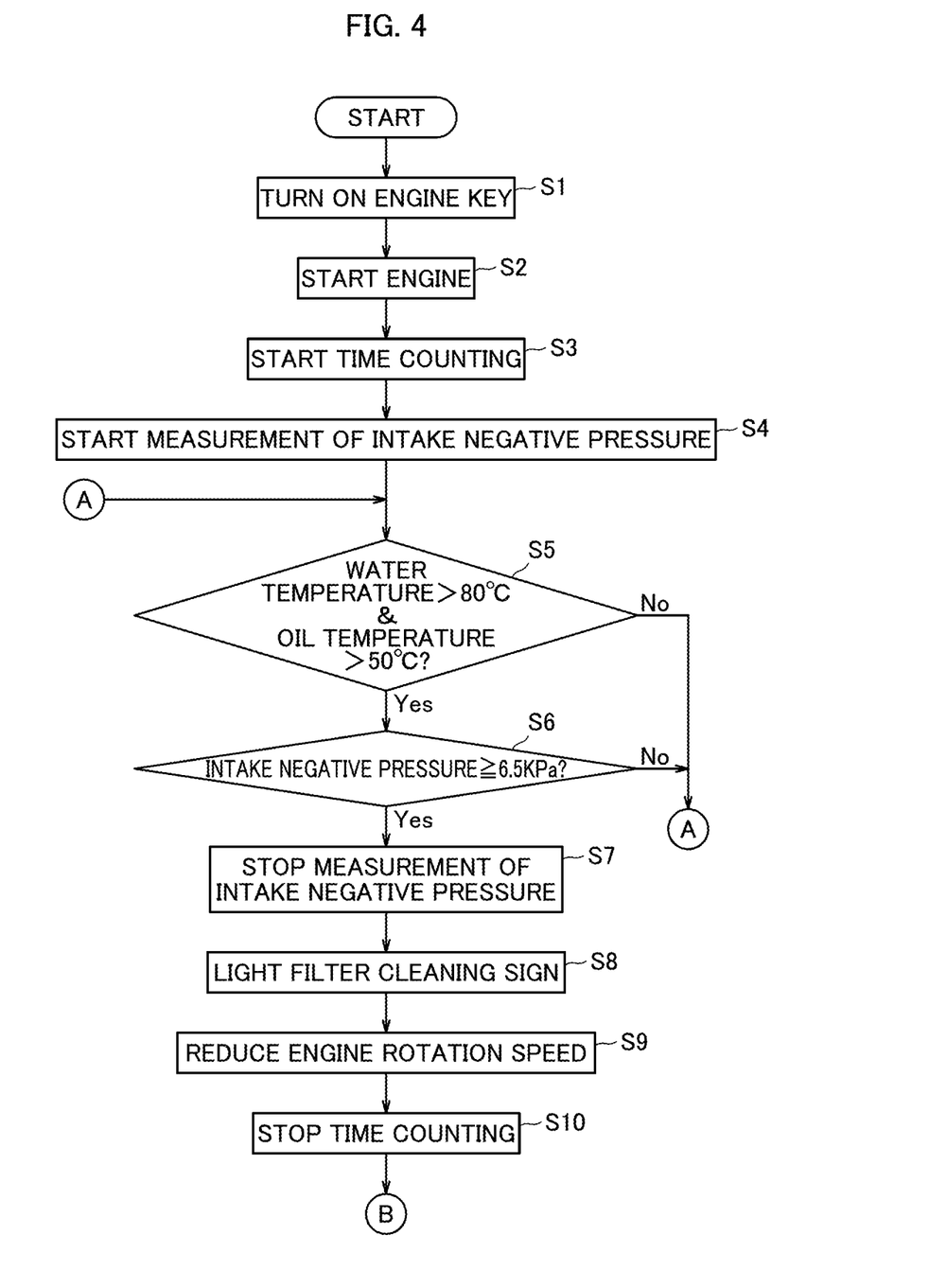
FIG. 4 is a flowchart illustrating an air filter deterioration determination routine performed by a controller.
Figure 5:
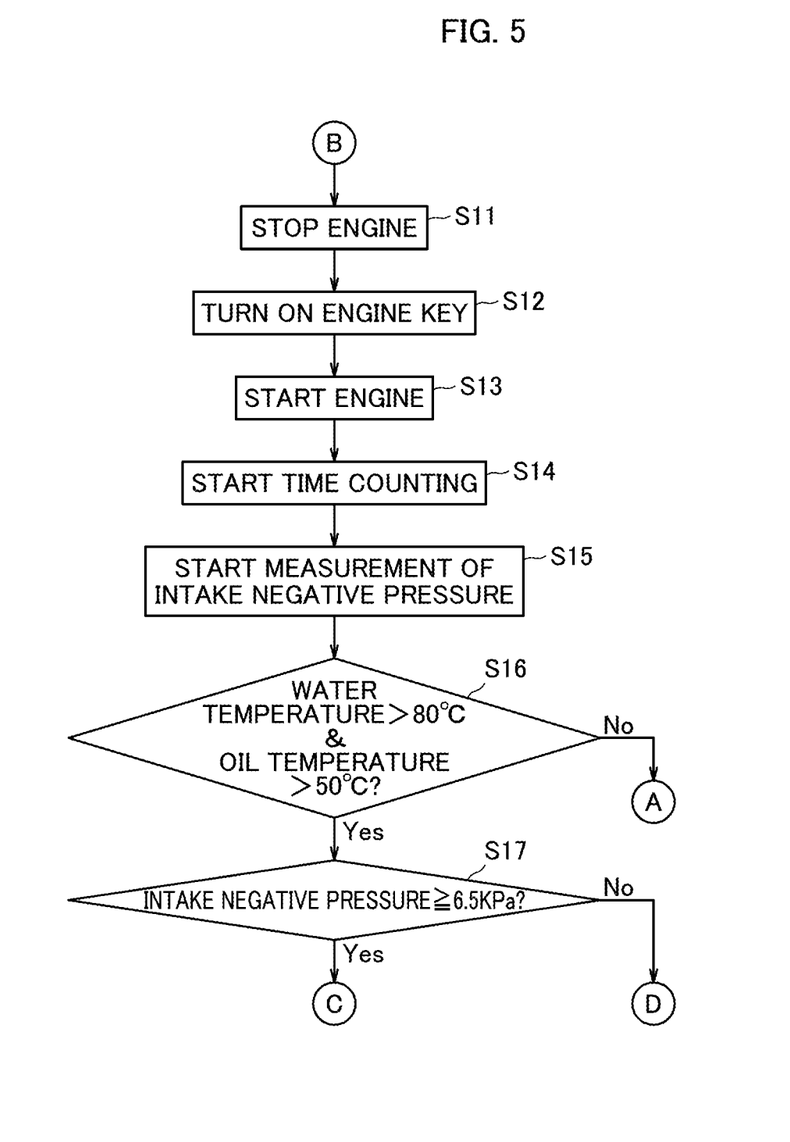
FIG. 5 is a flowchart illustrating an air filter deterioration determination routine performed by the controller.
Figure 6:
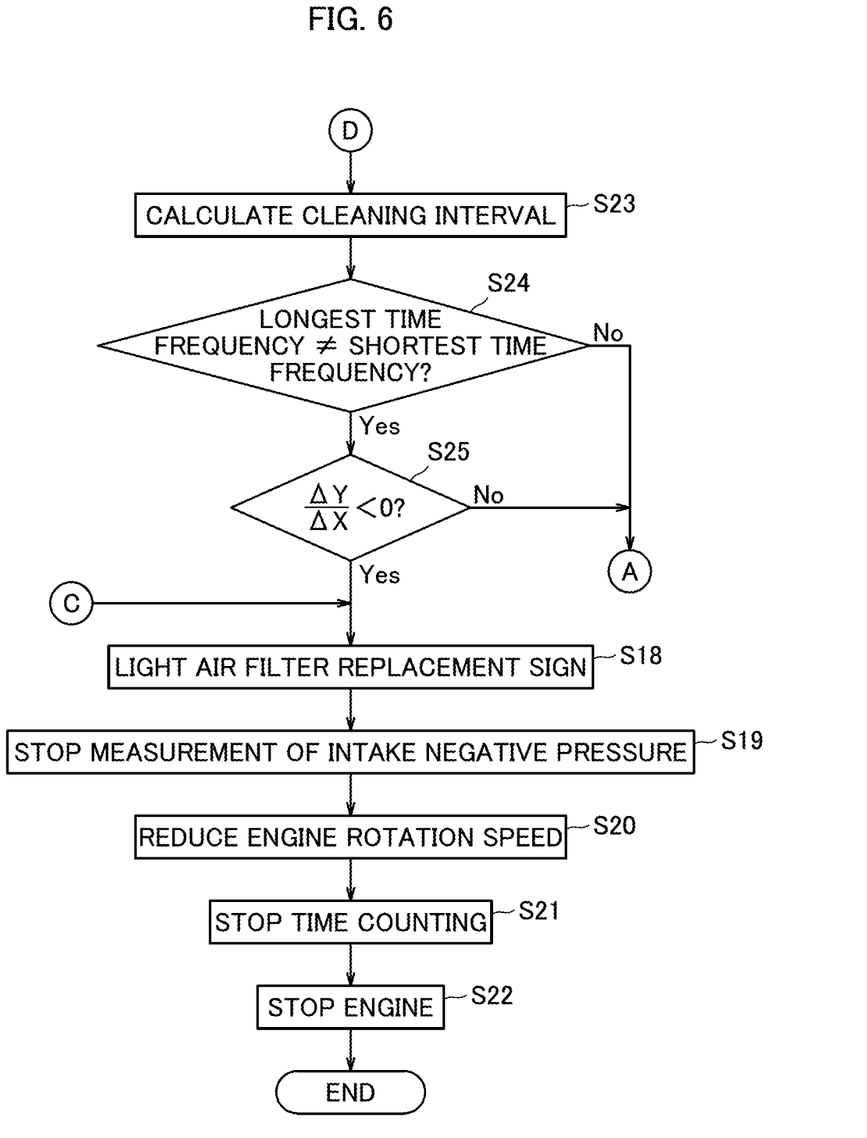
FIG. 6 is a flowchart illustrating a filter deterioration determination routine performed by the controller.

FIGS. 4 to 6 are each a flowchart illustrating an air filter deterioration determination routine performed by the controller 8, and the controller 8 performs the routine at a predetermined control interval when the power source of the construction machine is turned on.

First, when a key of the engine 2 is turned on in Step S1, the engine 2 is started in Step S2, time counting for measuring the cleaning interval S of the air filter 5 is started in Step S3, and measurement of the intake negative pressure by the intake air pressure measurement device 6 is started in Step S4. In subsequent Step S5, it is determined whether warming-up of the engine 2 is completed, and the process of Step S5 is repeated while the determination of No (negative) is made.

In this embodiment, the completion of the warming-up is determined on a condition that the cooling water temperature is 80° C. or higher, and the hydraulic oil temperature is 50° C. or higher. However, the condition of the warming-up completion is not limited to this, and can be arbitrarily changed.

When the determination of Yes (affirmative) is made in Step S5 due to the completion of the warming-up, the process proceeds to Step S6, and it is determined whether or not the intake negative pressure is 6.5 KPa or more (equivalent to the intake air measurement value calculation unit of the present invention). When the determination is No, it is regarded that the air filter 5 is not clogged yet, and the process returns to Step S5.

When dust gradually accumulates on the air filter 5 due to continued operation of the engine 2, and the intake negative pressure increased with the increase of the dust reaches 6.5 KPa, the clogging of the air filter 5 is determined, and the process proceeds to Step S7. In a case where the cooling water temperature and the hydraulic oil temperature are low, the degree of clogging of the air filter 5 cannot be accurately determined because the intake negative pressure is unstable. However, the determination is performed under an engine operating state in which the cooling water temperature and the hydraulic oil temperature are increased by the completion of the warming-up, and therefore the degree of clogging of the filter 5 can be determined with high precision.

Instead of the determining the degree of clogging of the air filter 5 on the condition that the warming-up is thus completed, the degree of clogging of the air filter 5 may be determined in a state in which the engine 2 is operated in a preset rotation region and a preset load region.

On the other hand, when the clogging of the air filter 5 is determined, and the process proceeds to Step S7, the measurement of the intake negative pressure is stopped, and the air filter cleaning instruction unit 10 lights the air filter cleaning sign in Step S8. The engine rotation speed is reduced in subsequent Step S9, the time counting of the cleaning interval S is stopped in Step S10, and the engine 2 is stopped in Step S11.

An operator recognizes the necessity of the cleaning of the air filter 5 by lighting of the filter cleaning sign, removes the air filter 5 from the air cleaner 4, cleans the air filter 5 by a method described in a manual, and then attaches the air filter 5 to the air cleaner 4 again.

Thereafter, when the key of the engine 2 is turned on again in Step S12, the engine 2 is started in Step S13, the time counting is started in Step S14, and the measurement of the intake negative pressure is started in Step S15. In subsequent Step S16, it is determined whether the warming-up of the engine 2 is completed. This process assumes that the cooling water temperature and the hydraulic oil temperature are decreased due to the engine stopping during cleaning of the air filter, and returns to Step S5 when the determination in Step S16 is No.

On the other hand, when the determination of Yes is made in Step S16, the process proceeds to Step S17, and it is determined whether or not the intake negative pressure is 6.5 KPa or more. When the determination of Yes is made in Step S17, the determination means that the intake negative pressure is not recovered yet even immediately after the cleaning of the air filter. Therefore, it is regarded that the air filter 5 reaches the use limit, the deterioration is determined, and the process proceeds to Step S18 (equivalent to the deterioration determination processing unit of the present invention).

In Step S18, the air filter replacement sign is lit by the air filter replacement instruction unit 11. In subsequent Step S19, the measurement of the intake negative pressure is stopped, and the engine rotation speed is reduced in Step S20. In subsequent Step S21, the time counting of the cleaning interval S is stopped, the engine 2 is stopped in Step S22, and then the routine is terminated.

Therefore, the operator recognizes the necessity of replacement of the air filter 5 by the lighting of the air filter replacement sign, removes the air filter 5 from the air cleaner 4 in the same manner as the case of the cleaning, and then attaches a new air filter 5 to the air cleaner 4.

On the other hand, when determination of No is made because the intake negative pressure is less than 6.5 KPa in Step S17, the intake negative pressure is recovered by the air filter cleaning, and therefore the use of the air filter 5 can be continued, and the process proceeds to Step S23. In Step S23, the current cleaning interval S is calculated on the basis of the time counting, and the classification information of each stage stored in the storage unit 8d is read out, converted into a histogram as illustrated in FIG. 7, and stored in the storage unit 8d (equivalent to the cleaning interval frequency calculation unit of the present invention).

In the process of Step S23 described in detail, the cleaning interval S is sequentially calculated as an accumulated value of the operating time of the engine 2 from the time of the previous cleaning until the clogging is determined (Step S6). In order to construct a histogram, previously, a minimum value to a maximum value of the cleaning interval S that may be measured are classified into a plurality of stages G0 to G7, and the classification information is stored in the storage unit 8d. The stages G0 to G1 side is equivalent to the shortest cleaning interval S, and the stages G6 to G7 side is equivalent to the longest cleaning interval S.

Figure 7:
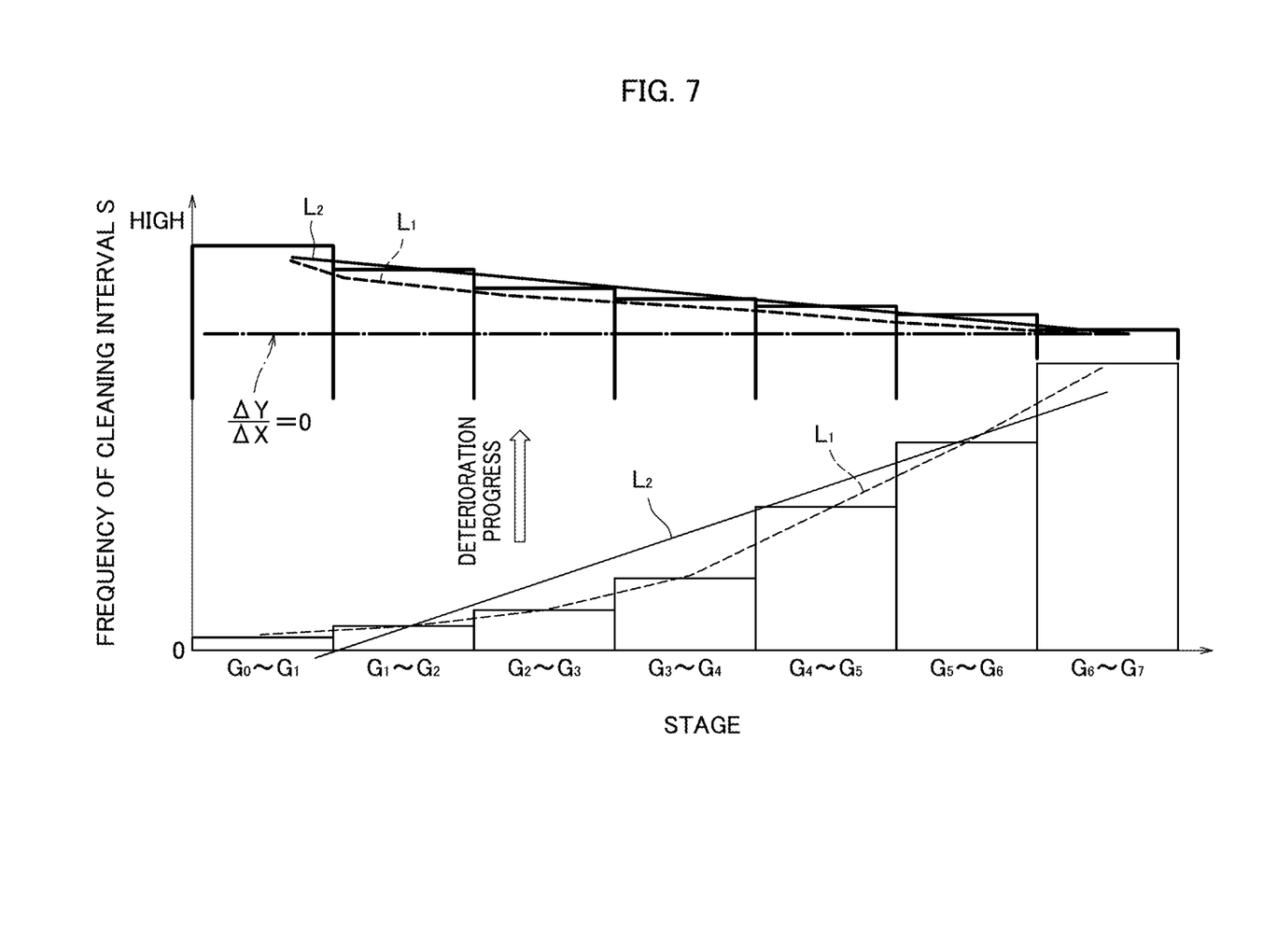
FIG. 7 is a characteristic diagram illustrating a histogram constructed by totalizing a cleaning interval, in which a thin line represents air filter use start time, and a thick line represents air filter use limit time.

The classification of each stage illustrated in FIG. 7 is an example, and is not particularly limited to the present situation and can be arbitrarily changed as long as the problem of the present invention can be solved.

As an example of how to classify each stage, it is conceivable that the maximum value of the cleaning interval S is taken as "the cleaning interval of the air filter at the time of first use in a plain with little dust", the minimum value of the cleaning interval S is taken as "the cleaning interval of the air filter in a case of working at an industrial waste site with a large amount of dust", an interval between the maximum value and the minimum value is classified by an arbitrary number, and numerical values such as G0 to G7 in FIG. 7 are set.

Then, the classification information of each stage is read from the storage unit 8d, it is determined which stage the cleaning interval S measured this time belongs to, and a current cleaning interval S is added to the stage. Each time the cleaning interval S is thus measured, the measured cleaning interval S is sequentially added to the stage to which the measured cleaning interval S is to belong. For example, when a period does not elapse since the start of use of the new air filter 5, a histogram (lower one in the figure) in which the axis of abscissas illustrated by a thin line in FIG. 7 represents the stage and the axis of ordinates represents the frequency (the number of times) of the cleaning interval S is constructed. At this time point, the histogram has a characteristic in which the frequency of the stages G6 to G7 side is high, and the frequency of the stages G0 to G1 side is low.

A characteristic line L1 of the histogram, that is, the characteristic line L1 illustrated by a broken line in FIG. 7 connecting the frequencies of the cleaning intervals S of the respective stages is obtained, and when this characteristic line L1 is approximated to a straight line, a positive (+) approximate straight line L2 is obtained when expressed by a right-upward slope in the figure, that is, $\Delta Y/\Delta X$, and the slope correlates with the degree of deterioration of the current filter 5. This is because the steeper the right-upward slope of the approximate straight line L2 is, the higher the frequency of the long cleaning interval S is, and therefore it is regarded that the amount of dust remaining on the air filter 5 is still small, and the period until the air filter 5 reaches the use limit is long.

Among the respective cleaning intervals S belonging to the respective stages, there are a cleaning interval S belonging to the stage shorter than the stage corresponding to the actual degree of deterioration, and a cleaning interval S belonging to the stage longer than the stage corresponding to the actual degree of deterioration by being influenced by a differential in the amount of dust contained in outside air in the environment in which the construction machine operates. However, since the degree of deterioration of the air filter 5 is determined on the basis of the approximate straight line L2 obtained from the histogram obtained by totalizing a large number of the cleaning intervals S, such an environmental influence is reduced, and a more accurate degree of deterioration is determined.

Since a case where the short cleaning interval S is measured increases gradually as the deterioration of the air filter 5 progresses, the frequency of the stages G0 to G1 side to which the short interval S belongs increases more rapidly compared to the frequency of the stages G6 to G7 side to which the long cleaning interval S belongs. As a result, the slope of the approximate straight line L2 gradually decreases as the deterioration progresses, and when the air filter 5 reaches the use limit that requires replacement, the histogram changes to the histogram having the characteristic (upper one in the figure) illustrated by the thick line in FIG. 7, and the approximate straight line L2 based on the above becomes negative (−) obtained when expressed by a left-upward slope, that is, $\Delta Y/\Delta X$.

As described below, in this embodiment, when the timing preceding the use limit of the air filter 5, that is, the slope of the approximate straight line L2 exceeds $\Delta Y/\Delta X=0$ equivalent to the horizontal, and becomes negative (−) side, the deterioration of the air filter 5 is determined. The air filter 5 cannot be sometimes replaced immediately due to restrictions such as a construction schedule of a construction machine, and therefore it is intended that time allowance is allowed.

The slope of the approximate straight line L2 for determining the deterioration of the air filter 5 is not limited to the above description. The period from the start of use to the limit of use differs depending on the specification of the air filter 5, and the timing at which the deterioration should be determined prior to the use limit of the air filter 5 is also determined in accordance with the type of construction machine, the operating environment, or the like. Therefore, the slope of the approximate straight line L2 when the deterioration is determined only needs to be set in consideration of the above conditions.

Based on the above relation between the histogram and the approximate straight line L2 and the degree of deterioration of the air filter 5, the flowchart of each of FIGS. 4 to 6 will be described.

When calculation of the cleaning interval S and histogram formation are performed in Step S23, the process proceeds to Step S24, and it is determined whether or not there are two or more stages to which the cleaning interval S currently belongs. When the determination result is No, the process returns to Step S5. The frequencies of the cleaning intervals S in at least two or more stages are required to obtain the approximate straight line L2, and therefore it is intended to determine whether or not the process is possible.

When the determination in Step S24 is Yes, the process proceeds to Step S25, the approximate straight line L2 is obtained on the basis of the histogram stored in the storage unit 8d, and the degree of deterioration of the air filter 5 is determined on the basis of the slope. Specifically, it is determined whether or not the slope of the approximate straight line L2 is $\Delta Y/\Delta X<0$, and when the slope is positive (+) as illustrated by the thin line in FIG. 7, it is regarded that the air filter 5 is not yet deteriorated, and the determination of No is made in Step S25, and the process returns to Step S5.

When the slope of the approximate straight line L2 exceeds $\Delta Y/\Delta X=0$ illustrated by an alternate long and short dash line in FIG. 7 to shift to a negative (−) region as the deterioration of the air filter 5 progresses, it is regarded that the air filter 5 deteriorates (equivalent to the deterioration determination processing unit of the present invention), the determination of Yes is made in Step S25, and the process proceeds to Step S18 described above. Therefore, although duplicated description will not be made, the processes of Steps S18 to 21 are performed, the air filter 5 is replaced by the operator in response to the lighting of the air filter replacement sign. Consequently, a series of processes of the controller 8 is terminated.

As described above, according to the air filter deterioration determination device 1 of a construction machine of this embodiment, every time the air filter is cleaned to eliminate the clogging of the air filter 5, the cleaning interval S is measured as the accumulated value of the operating time of the engine 2 from the previous cleaning until the clogging is determined, and sequentially totalized so as to belong to the corresponding preset stage on the histogram. Then, the approximate straight line L2 obtained by approximating the characteristic line L1 of the histogram to a straight line is obtained, and the degree of deterioration of the air filter 5 is determined on the basis of the slope.

The degree of deterioration of the air filter 5 is thus determined on the basis of the approximate straight line L2 obtained from the histogram obtained by totalizing a large number of the cleaning intervals S, and therefore, for example, the influence on the cleaning intervals S due to the differential of the amount of dust contained in outside air can be reduced, and the accurate degree of deterioration of the air filter 5 can be determined. Therefore, for example, in a case where the air filter replacement sign is lit when the deterioration of the air filter 5 is determined as in this embodiment, the air filter replacement sign can be lit at appropriate timing prior to the use limit. Consequently, the air filter can be replaced with sufficient allowance of time.

Instead of promoting the replacement only when the deterioration of the air filter 5 is determined, the current degree of deterioration of the air filter 5 may always be displayed. For example, the degree of deterioration may be displayed on the air filter replacement instruction unit 11 at percentages with the start use being 100% and the use limit being 0%. Even in this case, the degree of deterioration of the air filter 5 can be grasped and the replacement time may be predicted in advance. Therefore, it is possible to obtain the same effect as that of the embodiment.

In this embodiment, all the cleaning intervals S from the start of use of the air filter 5 are totalized on the histogram, and therefore the characteristic illustrated by the thick line in FIG. 7 is changed when the air filter 5 reaches the use limit. As a matter of course, all the cleaning intervals S from the start of use are included in the respective stages of the histogram at this use limit, and therefore the change in the slope of the approximate straight line L2 gradually becomes gentle as the deterioration of the air filter 5 progresses, and an error factor of the deterioration determination of the air filter 5 can be caused.

Therefore, as illustrated in FIG. 3, the period from the start of use of the air filter 5 to the limit of use may be classified into a plurality of determination periods T, and each time each determination period T may elapse, all data of the cleaning intervals S on the histogram may be deleted, and then, at the start of a next determination period, a newly measured cleaning interval S may be sequentially totalized on the histogram. Hereinafter, a case where this processing procedure is adopted will be described as another example.

[Another Example of Embodiment]

As an example, the life of the air filter 5 is about 5000 hours when represented as the accumulated value of the operating time of the engine 2 from the start of use in the operating environment of an average construction machine. On the other hand, the determination period T illustrated in FIG. 3 is preset to 1000 hours. The cleaning interval S is about 20 hours on average, while the cleaning interval S increases or decreases depending on the deterioration progress of the air filter 5 and the operating environment of the construction machine as described above.

As described with reference to FIG. 3 in the above embodiment, when the operation of the engine 2 is started in a state in which the air filter 5 is new, each time the cleaning interval S is measured, the clogging is determined, and the air filter is cleaned, the measured cleaning interval S is added to the corresponding stage on the histogram. The cleaning intervals S are totalized on the histogram until the first determination period T elapses, and at the time when the period elapses, for example, the histogram illustrated by the thin line in FIG. 7 (lower one in the figure) is constructed. An approximate straight line L2 obtained from the histogram has a right-upward slope indicating that the deterioration is slowly progressed, and therefore the deterioration of the air filter 5 is not determined.

However, in a case where the construction machine continues to operate in an environment where a large amount of dust is contained in outside air, a large number of the air filters are cleaned during the first determination period T, and the deterioration of the air filter 5 progresses rapidly. Therefore, the deterioration may be determined during the first determination period T.

Then, when the first determination period T elapses, all data of the cleaning intervals S on the histogram is deleted, and at the start of a second determination period T, a newly measured cleaning interval S is sequentially totalized on the histogram. In a case where the same processing is performed in each determination period T and the operating environment of the construction machine is not so different in each determination period T, the slope of the approximate straight line L2 based on the histogram decreases each time the determination period T is repeated. Then, at any time point, for example, when a fifth determination period T elapses, a histogram illustrated in FIG. 8 is constructed.

Figure 8:
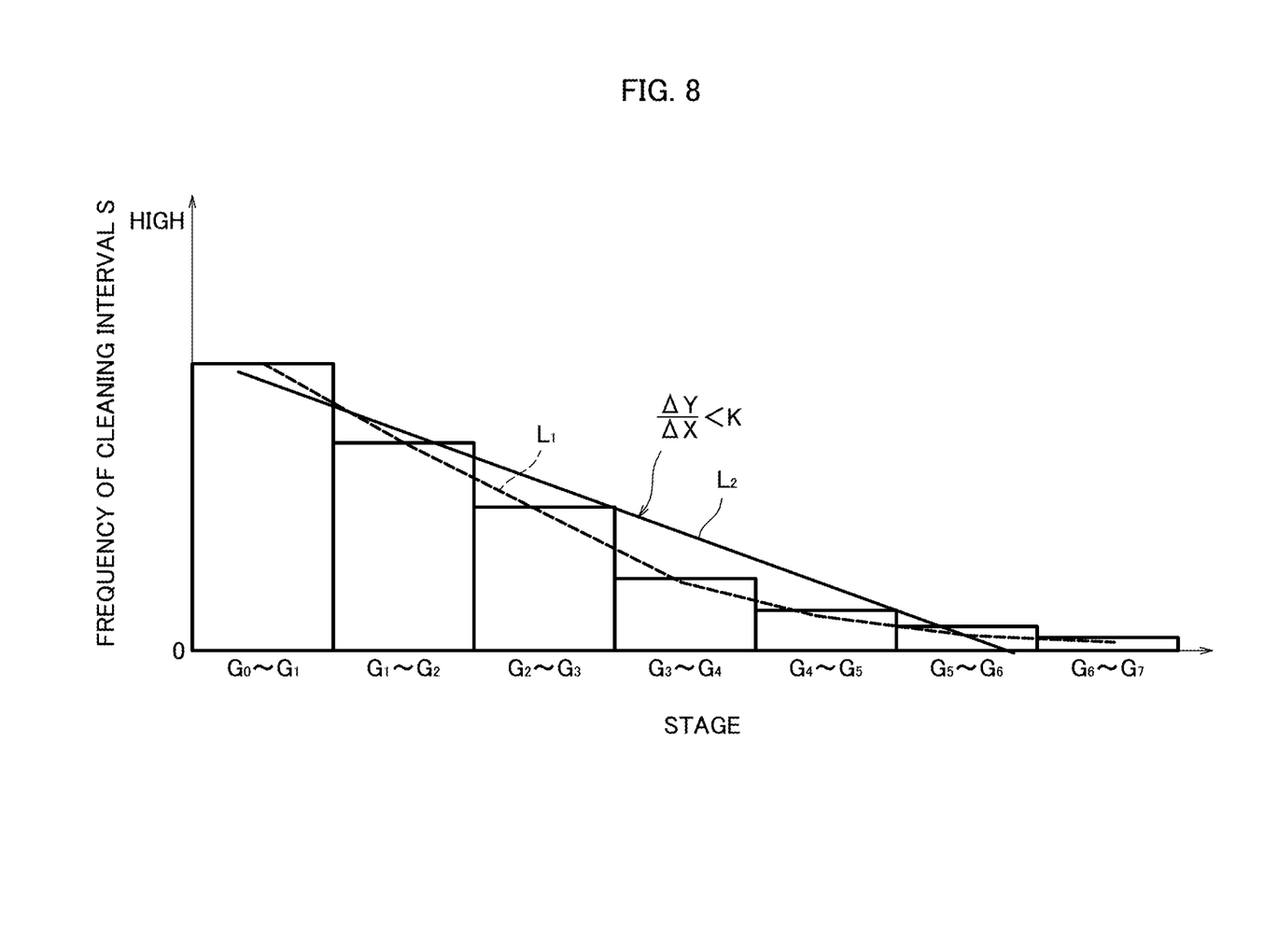
FIG. 8 is a characteristic diagram illustrating use limit time of a histogram of another example in which data of cleaning intervals on the histogram is deleted each time a determination period elapses.

In this another example, $\Delta Y/\Delta X < K$ (K is a determination value on the negative side) is preset as the determination content in Step S25 of FIG. 6 in place of $\Delta Y/\Delta X < 0$ described in the embodiment, and a slope of the approximate straight line L2 in FIG. 8 is equivalent to K. Therefore, when the slope of the approximate straight line L2 exceeds $\Delta Y/\Delta X = 0$, turns to the negative (−) side, further decreases, and falls below K, the air filter deterioration is determined. Similar to the embodiment, K is set so that the deterioration is determined at timing slightly prior to the use limit of the air filter 5.

Herein, the cleaning intervals S included in the respective stages of the histogram of FIG. 8 are all values measured in the current determination period T. In other words, the cleaning intervals S measured in each determination period T before the current determination period T are not included in the histogram. Thus, the histogram is constructed only from the cleaning intervals S of the latest (current determination period T), and the degree of deterioration of the air filter 5 is determined from the approximate straight line L2 based on the histogram. Therefore, the deterioration of the air filter 5 can be more accurately determined compared to the embodiment.

The data of the cleaning intervals S measured in a past determination period T is deleted, and therefore the amount of data handled by the controller 8 in order to determine the deterioration of the air filter 5 is reduced. Accordingly, a calculation load of the controller 8 for determining the deterioration of the air filter 5 is reduced, it is not necessary to use the controller 8 having high calculation capacity, and other controls to be performed by the controller 8, such as engine control and work machine control of a construction machine, can be performed smoothly.

Although the description of the embodiment is thus terminated, an aspect of the present invention is not limited to this embodiment. For example, in the above embodiment, when the clogging or the deterioration of the air filter 5 is determined, the air filter cleaning instruction unit 10 and the air filter replacement instruction unit 11 are lit as the air filter cleaning sign and the air filter replacement sign. However, the present invention is not limited to this. For example, an operator may be notified by voice or an alarm.

The single air filter 5 is installed in the air cleaner 4 in the above embodiment, but an upstream air filter and a downstream air filter may be installed. For example, the degree of clogging of the downstream air filter can be determined on the basis of differential pressure between intake negative pressure on the upstream side and intake negative pressure on the downstream side.

EXPLANATION OF REFERENCE SIGNS 1 air filter deterioration determination device
2 engine (motor)

5 air filter
6 intake air pressure measurement device
8 controller
8a intake air measurement value calculation unit
8b cleaning interval frequency calculation unit
8c deterioration determination processing unit
8d storage unit
10 air filter cleaning instruction unit
11 air filter replacement instruction unit

The invention claimed is:

1. An air filter deterioration determination device of a construction machine comprising:
   an intake air pressure measurement device that measures intake negative pressure of a motor mounted as a power source of a construction machine; and
   a controller that is communicably connected to the motor and the intake air pressure measurement device, and determines deterioration of an air filter for removing dust in intake air to be supplied to the motor, wherein the controller includes:
   an intake air measurement value calculation unit that determines a degree of clogging of the air filter for filtering the intake air of the motor on the basis of the intake negative pressure measured by the intake air pressure measurement device;
   a storage unit that stores a plurality of groups previously set by classifying a minimum value to a maximum value of a cleaning interval, the cleaning interval being an accumulated value of operating time of the motor from previous cleaning of the air filter until the clogging is determined by the intake air measurement value calculation unit;
   a cleaning interval frequency calculation unit that measures the cleaning interval each time the clogging is determined by the intake air measurement value calculation unit and the air filter is cleaned, that sequentially adds the measured cleaning interval to a group to which the measured cleaning interval is to belong, among the plurality of groups, and that totalizes frequency of the cleaning interval in each of the groups; and
   a deterioration determination processing unit that determines a degree of deterioration of the air filter on the basis of the frequency of the cleaning interval in each of the group, the frequency being totalized by the cleaning interval frequency calculation unit.

2. The air filter deterioration determination device of the construction machine according to claim 1, wherein the cleaning interval frequency calculation unit constructs a histogram in which the plurality of groups are regarded as a plurality of stages, an axis of abscissas represents the stages, and an axis of ordinates represents the frequency of the cleaning interval, and the deterioration determination processing unit obtains an approximate straight line obtained by approximating a characteristic line of the histogram constructed by the cleaning interval frequency calculation unit to a straight line, and determines the degree of deterioration of the air filter on the basis of a slope of the approximate straight line.

3. The air filter deterioration determination device of the construction machine according to claim 1, further comprising an air filter replacement instruction unit that instructs replacement of the air filter, wherein the deterioration determination processing unit causes the air filter replacement instruction unit to instruct the replacement of the air filter, when it is determined that the air filter reaches use limit, on the basis of the frequency of the cleaning interval in each of the groups, and deterioration is determined.

4. The air filter deterioration determination device of the construction machine according to claim 1, further comprising: an air filter cleaning instruction unit that instructs cleaning of the filter; and an air filter replacement instruction unit that instructs replacement of the filter, wherein the intake air measurement value calculation unit causes the air filter cleaning instruction unit to instruct the cleaning of the air filter, when the clogging of the air filter is determined, the cleaning interval frequency calculation unit causes the air filter replacement instruction unit to instruct the replacement of the air filter, when the intake negative pressure of the motor is not recovered even though the air filter is cleaned on the basis of the instruction by the air filter cleaning instruction unit.

5. The air filter deterioration determination device of the construction machine according to claim 1, wherein the intake air measurement value calculation unit determines the degree of clogging of the air filter, when the motor is operated in a preset operating state.

6. The air filter deterioration determination device of the construction machine according to claim 1, wherein the cleaning interval frequency calculation unit sequentially adds each of all the cleaning intervals from start of use of the air filter to a group to which the cleaning interval is to belong, and totalizes the frequency of the cleaning interval in each of the groups.

7. The air filter deterioration determination device of the construction machine according to claim 1, wherein the cleaning interval frequency calculation unit deletes data of the totalized cleaning interval in each group each time each of a plurality of determination periods previously set by classifying a period from start of use of the air filter to limit of use elapses, and a newly measured cleaning interval is sequentially added to a group to which the newly measured cleaning interval is to belong, at start of a next determination period, and the frequency of the cleaning interval in each of the groups is totalized.

* * * * *